(12) United States Patent
Yoshikawa et al.

(10) Patent No.: US 10,764,478 B2
(45) Date of Patent: Sep. 1, 2020

(54) CAMERA MODULE INCLUDES A LENS UNIT THAT IS FIXED TO A HOLDING MEMBER HAVING AN IMAGE SENSOR VIA AN ENGAGING MEMBER OF CURED RESIN AND MANUFACTURING METHOD THEREOF

(71) Applicant: KYOCERA Corporation, Kyoto-shi, Kyoto (JP)

(72) Inventors: Atsushi Yoshikawa, Sagamihara (JP); Shota Iwano, Sagamihara (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/771,185

(22) PCT Filed: Jun. 30, 2016

(86) PCT No.: PCT/JP2016/003136
§ 371 (c)(1),
(2) Date: Apr. 26, 2018

(87) PCT Pub. No.: WO2017/072985
PCT Pub. Date: May 4, 2017

(65) Prior Publication Data
US 2018/0324337 A1 Nov. 8, 2018

(30) Foreign Application Priority Data

Oct. 28, 2015 (JP) ................ 2015-212391

(51) Int. Cl.
*H04N 5/225* (2006.01)
*G03B 17/02* (2006.01)
*G02B 7/02* (2006.01)
*G02B 7/04* (2006.01)

(52) U.S. Cl.
CPC ............ *H04N 5/2254* (2013.01); *G02B 7/02* (2013.01); *G02B 7/021* (2013.01); *G03B 17/02* (2013.01); *H04N 5/2253* (2013.01); *G02B 7/04* (2013.01)

(58) Field of Classification Search
CPC .... H04N 5/2254; H04N 5/2253; G02B 7/021; G02B 7/04; G02B 7/02; G03B 17/02
See application file for complete search history.

(56) References Cited

U.S. PATENT DOCUMENTS 5,666,605 A * 9/1997 Tokimatsu ............ H01T 19/04
250/324
8,454,250 B2 * 6/2013 Yamamoto ............ G02B 7/003
359/827

(Continued)

FOREIGN PATENT DOCUMENTS

JP H8-300725 A 11/1996
JP H9-131451 A 5/1997

(Continued)

*Primary Examiner* — Luong T Nguyen
(74) *Attorney, Agent, or Firm* — Procopio Cory Hargreaves and Savitch LLP

(57) ABSTRACT

A camera module includes a lens unit containing a lens, a holding member provided with an image sensor and an engaging member of cured resin. At least a part of the engaging member includes a surface that intersects with a direction of an optical axis of the lens and the lens unit and the holding member are engaged with each other on the surface.

18 Claims, 15 Drawing Sheets

(56) References Cited

U.S. PATENT DOCUMENTS

| | | | | |
|---|---|---|---|---|
| 2005/0030484 A1* | 2/2005 | Kuroda | ............... | G03B 21/16 |
| | | | | 353/57 |
| 2010/0117176 A1* | 5/2010 | Uekawa | ............ | H01L 27/14618 |
| | | | | 257/432 |
| 2013/0076977 A1* | 3/2013 | Hirota | ............... | H04N 5/2253 |
| | | | | 348/374 |
| 2014/0240588 A1* | 8/2014 | Sakuragi | ............. | H04N 5/2252 |
| | | | | 348/373 |
| 2014/0298642 A1* | 10/2014 | Sesti | ................. | G02B 7/025 |
| | | | | 29/592.1 |
| 2015/0256726 A1* | 9/2015 | Kaioka | ............... | G01B 11/26 |
| | | | | 348/360 |
| 2016/0144505 A1* | 5/2016 | Fong | ................. | B25J 9/1602 |
| | | | | 700/250 |

FOREIGN PATENT DOCUMENTS

| | | |
|---|---|---|
| JP | 2014-71172 A | 4/2014 |
| JP | 2014-186212 A | 10/2014 |
| JP | 2015-138114 A | 7/2015 |
| JP | 2015-143878 A | 8/2015 |

\* cited by examiner

CAMERA MODULE INCLUDES A LENS UNIT THAT IS FIXED TO A HOLDING MEMBER HAVING AN IMAGE SENSOR VIA AN ENGAGING MEMBER OF CURED RESIN AND MANUFACTURING METHOD THEREOF

CROSS-REFERENCE TO RELATED APPLICATION

The present application claims priority from and the benefit of Japanese Patent Application No. 2015-212391 filed on Oct. 28, 2015, the entire contents of which are incorporated herein by reference.

TECHNICAL FIELD

The present disclosure relates to a camera module and a manufacturing method thereof.

BACKGROUND

In a camera module, a lens unit having a lens and a holding member having an image sensor are fixed with screws after the lens and the image sensor are aligned with each other. In this case, when screws are tightened, an external force caused by rotation of screws or sinking of the member is applied to the lens unit or the holding member, and accuracy of alignment between the lens and the image sensor may be reduced. To prevent this, there is a method of fixing a lens unit and a holding member with an adhesive. An interfacial failure can often occur at an interface between the adhesive and a member to be adhered.

SUMMARY

A camera module according to an embodiment of this disclosure includes a lens unit containing a lens, a holding member provided with an image sensor and an engaging member of cured resin. At least a part of the engaging member includes a surface that intersects with the direction of an optical axis of the lens. The engaging member engages the lens unit and the holding member with each other on the surface.

A manufacturing method of the camera module according to an embodiment of this disclosure includes a step of filling to a resin with a lens unit containing a lens and a holding member provided with an image sensor aligned with each other in the direction of the optical axis of the lens. The manufacturing method includes a step of curing the resin to produce an engaging member of cured resin that engages the lens unit and the holding member with each other. At least a part of the engaging member includes a surface that intersects with the direction of the optical axis of the lens. The engaging member engages the lens unit and the holding member with each other on the surface.

DETAILED DESCRIPTION

Embodiment 1

Schematic figures are used in the following description. These figures are not necessarily to scale.

[Camera Module Configuration]

Figure 1:
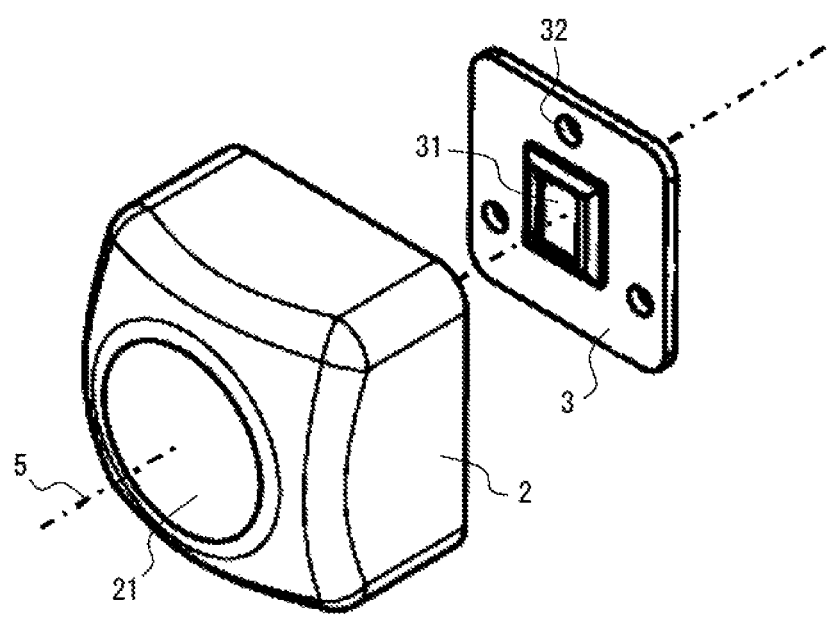
FIG. 1 is an exploded perspective view illustrating a configuration example of a camera module according to Embodiment 1.

As illustrated in FIG. 1, a camera module 1 includes a lens unit 2 and a holding member 3. The lens unit 2 contains a lens 21. The lens 21 is fixed to the lens unit 2. The holding member 3 contains an image sensor 31. The image sensor 31 is fixed to the holding member 3. The holding member 3 is provided with a filling hole 32. The holding member 3 may be provided with a plurality of filling holes 32. In FIG. 1, three filling holes 32 are provided. The lens unit 2 and the holding member 3 can be fixed at three positions by three filling holes 32. The number of the filling holes 32 is not limited to three.

The lens unit 2 and the holding member 3 are engaged with each other by filling an adhesive from the filling holes 32 with the lens 21 and the image sensor 31 aligned with each other and by curing the adhesive. The adhesive may be a resin such as epoxy, but is not limited thereto. The adhesive may be a photo-curable resin that cures when irradiated with a light. The light may be a UV light, for example, but is not limited thereto. The adhesive may be a thermosetting resin that cures when applied with heat. The adhesive may be other cured resins. In this application, "engagement" means that two or more members are engaged with each other to be integrated such that their movements are regulated with each other.

The state where the lens 21 and the image sensor 31 are aligned with each other means that they are aligned with respect to the direction of an optical axis 5 of the lens 21 and with respect to the direction perpendicular to the optical axis 5, respectively. The direction of the optical axis 5 of the lens 21 is also referred to as an axial direction. The direction perpendicular to the optical axis 5 of the lens 21 is also referred to as a radial direction. The state where they are aligned with respect to the radial direction is a state where the optical axis 5 of the lens 21 coincides with a perpendicular line passing through the center of a light receiving surface of the image sensor 31. The state where they are aligned with respect to the axial direction means that a state where the image forming position of the lens 21 coincides with the light receiving surface of the image sensor 31. When the distance from the camera module 1 to an object is far enough to be regarded as infinity, the image forming position of the lens 21 coincides with the position that is far away from the lens 21 by its focal length.

Figure 2:
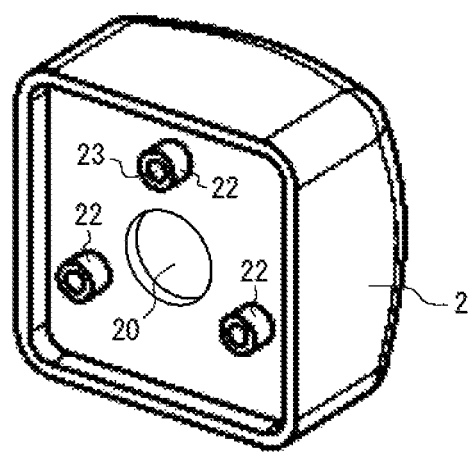
FIG. 2 is a perspective view of a lens unit in FIG. 1 seen from an image sensor side.

As illustrated in FIG. 2, the lens unit 2 has an opening 20, bosses 22 and holes 23. The opening 20 is a portion through which a light incident on the lens 21 passes and reaches the image sensor 31. At the opening 20, an optical material such as one or more other lenses or various filters that form the optical system are disposed with the lens 21. Three bosses 22 and holes 23 are provided relative to each position of the filling holes 32 of the holding member 3. Each boss 22 projects at least partially along the direction of the optical axis 5 as illustrated in FIG. 1. Each hole 23 extends at least partially along the direction of the optical axis 5.

Figure 3:
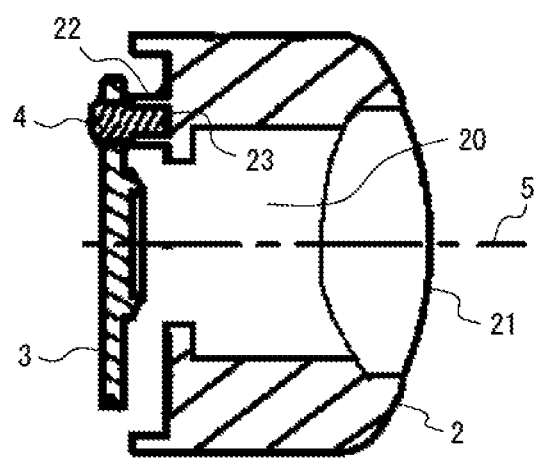
FIG. 3 is a cross-sectional view of the camera module in FIG. 1.

As illustrated in FIG. 3, the camera module 1 further includes an engaging member 4 formed by curing an adhesive. The engaging member 4 formed by curing an adhesive is also referred to as an engaging member 4 of a cured resin. At least a part of the engaging member 4 includes a surface that intersects with the direction of the optical axis 5 of the lens 21. The engaging member 4 engages the lens unit 2 and the holding member 3 with each other on the surface that intersects with the direction of the optical axis 5 of the lens 21. Each boss 22 of the lens unit 2 is provided such that it projects to the side facing the holding member 3. Each boss 22 and each hole 23 of the lens unit 2 may have an axis in approximately the same direction with that of the optical axis 5 of the lens 21, but not limited thereto.

Each boss 22 has a surface on the side facing the holding member 3. An adhesive is filled in a space between the surface of the boss 22 on the side facing the holding member 3 and the holding member 3, and into the hole 23. The filled adhesive cures and is formed as an engaging member 4. In other words, the engaging member 4 is produced by curing the filled adhesive. The surface of the boss 22 facing the holding member 3 is in contact with the engaging member 4.

Figure 4:
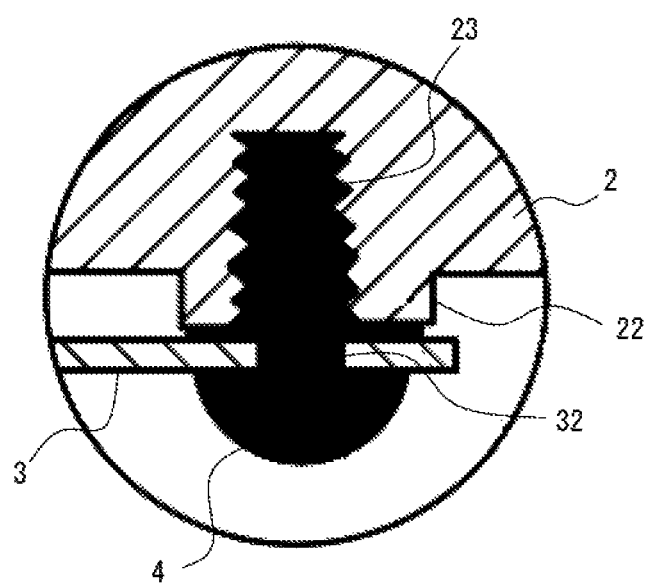
FIG. 4 is an enlarged view of a boss and its periphery.

As illustrated in FIG. 4, the engaging member 4 formed by curing the adhesive spreads between the lens unit 2 and the holding member 3, into the hole 23 of the lens unit 2, into the filling hole 32 of the holding member 3 and over the first surface of the holding member 3. The first surface of the holding member 3 is a surface opposite the surface facing the lens unit 2. The space between the lens unit 2 and the holding member 3 is narrowed by projecting the boss 22 from the lens unit 2. When the boss 22 is provided, the amount of adhesive filled between the lens unit 2 and the holding member 3 can be decreased.

In FIG. 4, the engaging member 4 includes a first part present on a first surface of the holding member 3 and a second part present between the lens unit 2 and the holding member 3. The end of the filling hole 32 of the holding member 3 is sandwiched by the first part and the second part of the engaging member 4 in the direction of the optical axis 5. The end of the filling hole 32 is at least a part of the holding member 3. In another aspect, a normal line directing from the holding member 3 to the engaging member 4 on at least a part of the surface of the engaging member 4 in contact with the holding member 3 is a component of the direction directing to the side of the lens unit 2 and has a component that is parallel to the optical axis 5 of the lens 21. Such configuration prevents the holding member 3 and the engaging member 4 from moving each other to the direction of the optical axis 5.

Further, in FIG. 4, the hole 23 provided in the lens unit 2 has internal threads. These internal threads are sandwiched in the direction of the optical axis 5 by the engaging member 4 present in the hole 23 such that the movement in the direction of the optical axis 5 is prevented. At least a part of the lens unit 2 or at least a part of an inner peripheral surface of the hole 23 of the lens unit 2 is sandwiched by the engaging member 4 in the direction of the optical axis 5. In another aspect, a normal line directing from the lens unit 2 to the engaging member 4 on at least a part of the surface of the engaging member 4 in contact with the lens unit 2 has a component of the direction that is in parallel with the optical axis 5 and is toward the side of the holding member 3. Besides the adhesive force of the engaging member 4, such configuration prevents the lens unit 2 and the engaging member 4 from moving each other toward the optical axis 5. Instead of provided with internal threads, the hole 23 may be subjected to emboss processing. Even when the hole 23 is subjected to emboss processing, the lens unit 2 and the engaging member 4 are prevented from moving each other toward the optical axis 5. When the hole 23 is provided with internal threads, it is considered that the engaging member 4 filled in the hole 23 and cured therein has a form of resin screw in the hole 23.

The lens unit 2 and the holding member 3 are engaged respectively with the engaging member 4, and thus are prevented from moving each other toward the optical axis 5, that is, prevented from moving in the axial direction. As a result of this, the distance between the lens 21 and the image sensor 31 is maintained, and the state where they are aligned with each other in the axial direction is maintained. When the lens unit 2 and the holding member 3 move each other in the axial direction, a compression force or a tensile force is applied to the engaging member 4.

The lens unit 2 and the holding member 3 are prevented respectively from moving in the direction perpendicular to the optical axis 5, that is, in the radial direction, due to a presence of the engaging member 4 in the hole 23 and the filling hole 32. As a result of this, the state where the optical axis 5 of the lens 21 and the perpendicular line passing through the center of the light receiving surface of the image sensor 31 coincident with each other is maintained, and the state where they are aligned with each other in the radial direction is maintained. When the lens unit 2 and the holding member 3 intend to move each other in the radial direction, a shear force is applied to the engaging member 4.

When representing the configuration of the lens unit 2 and the holding member 3 engaged with each other in another aspect, the lens unit 2 and the holding member 3 are provided respectively with a first engaging part and a second engaging part. The engaging member 4 connects the first engaging part and the second engaging part in the direction of the optical axis 5. The first engaging part corresponds to the hole 23 provided in the lens unit 2. The second engaging part corresponds to the filling hole 32 provided in the holding member 3.

The first engaging part corresponding to the hole 23 is a regulation-shaped hole that regulates the lens unit 2 and the engaging member 4 from moving each other toward the optical axis 5. The second engaging part corresponding to the filling hole 32 is a through hole passing through the holding member 3.

In other words, the hole corresponding to the first engaging part and the through hole corresponding to the second engaging part are communicated by the engaging member 4, and the engaging member 4 is restricted from moving toward the optical axis 5 by the regulation shape of the hole.

The engaging member 4 may maintain the engagement between the lens unit 2 and the holding member 3 not by means of an adhesive force of the interface with them, but by means of a tensile force, a compression force or a shear force applied to the engaging member 4 itself. When the strength of the cured adhesive itself that forms the engaging member 4 is larger than the adhesive force of the interface, the configuration illustrated in FIG. 4 indicates an engaging force that is larger than mere adhesion.

Thus the lens unit 2 and the holding member 3 can be fixed without applying an external force after alignment. Positional misalignment between the lens unit 2 and the holding member 3 when fixing them can be prevented.

Members such as screw and vis are not needed. Omitting a space for members such as screw and vis allows for a design with a high degree of freedom.

[Camera Module Manufacturing Method]

Figure 5:
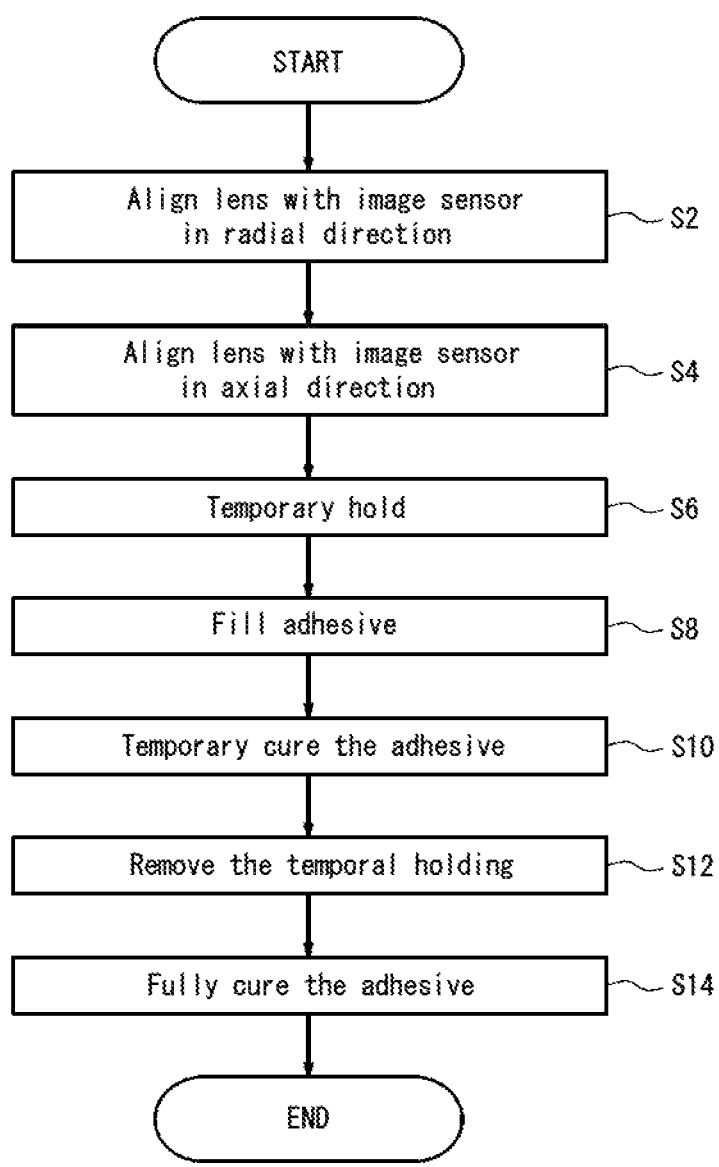
FIG. 5 is a flowchart illustrating an example of a manufacturing method of the camera module.

The manufacturing method of the camera module 1 is performed following the flowchart illustrated in FIG. 5. The lens unit 2 and the holding member 3 are aligned with each other in the radial direction (step S2). As illustrated in FIG. 1, the lens unit 2 and the holding member 3 may be moved respectively such that the optical axis 5 of the lens 21 coincides with the perpendicular line passing through the center of the light receiving surface of the image sensor 31.

The lens unit 2 and the holding member 3 are aligned with each other in the axial direction (step S4). The distance between the lens 21 and the image sensor 31 is determined such that the image forming position of the lens 21 coincides with the light receiving surface of the image sensor 31. The lens unit 2 and the holding member 3 may be moved respectively to adjust the distance between the lens 21 and the image sensor 31.

Alignment between the lens unit 2 and the holding member 3 in steps S2 and S4 may be performed with only one of them moved and the other fixed or with both of them moved. Steps S2 and S4 may be reversed. Steps S2 and S4 may be performed with lens unit 2 and/or holding member 3 moved by a 6-axis adjustable apparatus, for example. The 6-axis adjustable apparatus may be a robot, for example.

The lens unit 2 and the holding member 3 are temporary held (step S6). The temporal holding may be performed to hold the lens unit 2 and the holding member 3 while they are aligned. The temporal holding may be performed successively by an apparatus used for alignment, for example, or by mounting a jig for temporal holding.

An adhesive is filled from the three filling holes 32 provided in the holding member 3 (step S8). The adhesive is filled between the boss 22 and the holding member 3 and into the hole 23. The adhesive may be filled in the filling hole 32. As illustrated in FIG. 4, the adhesive may be heaped on the first surface of the holding member 3. When the adhesive is filled in this manner, the lens unit 2 or the holding member 3 is not needed to be moved for applying the adhesive. The adhesive can be filled with the lens unit 2 and the holding member 3 aligned with each other. The lens unit 2 and the holding member 3 can be connected with each other with the holding member 3 aligned with the lens unit 2 in the direction of the optical axis 5 of the lens 21.

The adhesive is cured (step S10). As the adhesive, ultraviolet cure adhesive or thermosetting adhesive or the like may be used. The ultraviolet is also referred to as UV (Ultra Violet). The filled adhesive can be cured by UV irradiation on the adhesive or heating of the adhesive, or the like. When the adhesive is cured, the lens unit 2 and the holding member 3 can be fixed without being applied with an external force. Positional misalignment between the lens unit 2 and the holding member 3 cannot be caused by an external force. In this embodiment, UV curing+thermosetting adhesive, which is a curing by both UV irradiation and heating, is used. The UV curing+thermosetting adhesive is temporary cured by UV irradiation, and after that, is fully cured by heating, thus can have a larger shear strength. The shear strength of the adhesive fully cured by heating can increase. When UV curing+thermosetting adhesive is used, the adhesive is temporary cured by UV irradiation in step S10.

Temporal holding for the lens unit 2 and the holding member 3 is removed (step S12). When the temporal holding is performed by an apparatus used for alignment, the temporal holding is removed by removing it from the apparatus. When a jig for temporal holding is mounted, the temporal holding is removed by removing the jig.

The adhesive is fully cured (step S14). The lens unit 2 and the holding member 3 are engaged with each other by fully curing the adhesive. In this embodiment, the adhesive is fully cured by heating. The temperature at which the adhesive is fully cured may be lower than the melting point of each member contained in the lens unit 2 and the holding member 3.

According to the manufacturing method illustrated in FIG. 5, the lens unit 2 and the holding member 3 can be fixed with aligned with each other without receiving an external force. The lens unit 2 and the holding member 3 do not receive an external force when they are fixed, and thus positional misalignment between them can be prevented. An adhesive can be filled with the lens unit 2 and the holding member 3 aligned with each other. An adhesive can be filled without any of the lens unit 2 or the holding member 3 evacuated. Thus the man-hour for filling an adhesive can be reduced.

In this embodiment, a temporal curing step by UV irradiation and a full curing step by heating are performed as a separate step. The curing step of adhesive is not limited thereto. For example, both temporal curing and full curing may be performed in step S10.

Embodiment 2

The lens unit 2 may further have a rib 24 that connects three bosses 22.

Figure 6:
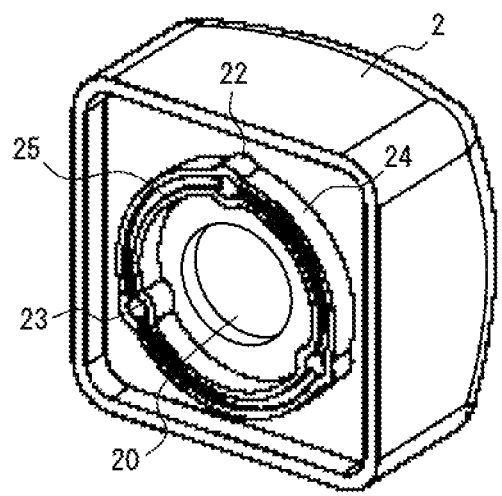
FIG. 6 is a perspective view of a configuration example of a lens unit according to Embodiment 2 seen from an image sensor side.

The lens unit 2 illustrated in FIG. 6 has the rib 24 that connects three bosses 22. The rib 24 may have a groove 25. The groove 25 may connect the holes 23 provided in the bosses 22. The rib 24 and the groove 25 may be provided on at least a part of the circumference of the optical axis 5. The rib 24 and the groove 25 may be provided over the entire circumference of the optical axis 5.

Figure 7:
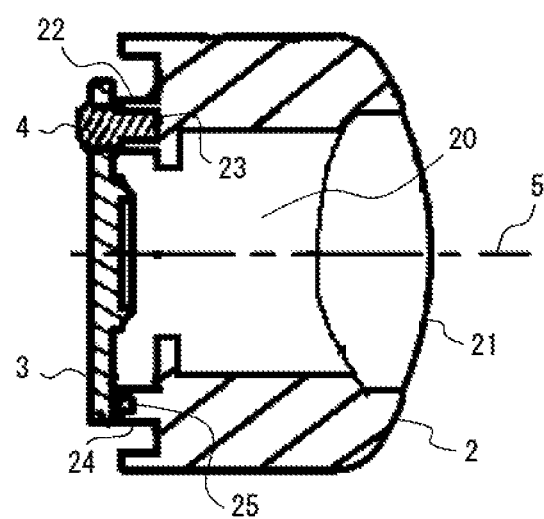
FIG. 7 is a cross-sectional view of a camera module in FIG. 6.

The camera module 1 illustrated in FIG. 7 is different from the camera module 1 illustrated in FIG. 3 in that the lens unit 2 has the rib 24 and the groove 25. The adhesive is filled from the filling hole 32 that corresponds to the boss 22 and spreads from the hole 23 to the rib 24 and the groove 25. The filled adhesive cures and forms the engaging member 4. The engaging member 4 may be formed on at least a part of the circumference of the optical axis 5. The engaging member 4 may be provided over the entire circumference of the optical axis 5. When the engaging member 4 is formed on all around the optical axis 5, the image sensor 31 is sealed by the engaging member 4 that extends over the rib 24 and the groove 25.

According to the lens unit 2 of this embodiment, the image sensor 31 can be sealed by the engaging member 4. The adhesive can spread to the rib 24 and the groove 25 by a capillary action. The adhesive can be filled in a portion provided with no filling hole 32 with the lens unit 2 and the holding member 3 aligned with each other. The lens unit 2 or the holding member 3 is not needed to be evacuated when an adhesive is filled.

Embodiment 3

The lens unit 2 may not have the boss 22.

Figure 8A:
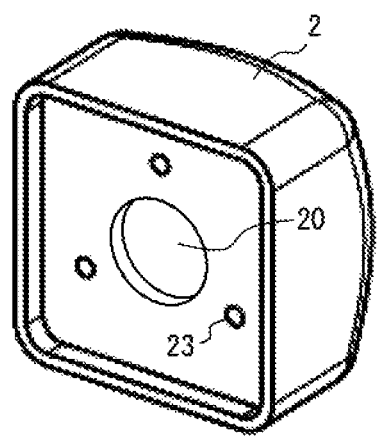
FIG. 8A is a perspective view of a configuration example of a lens unit according to Embodiment 3 seen from an image sensor side.
Figure 8B:
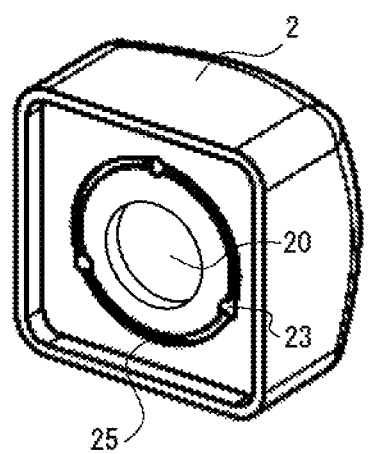
FIG. 8B is a perspective view of a configuration example of the lens unit according to Embodiment 3 seen from the image sensor side.

The lens unit 2 illustrated in FIG. 8A does not have the bosses 22 and has only holes 23. Besides the configuration illustrated in FIG. 8A, the lens unit 2 illustrated in FIG. 8B further has a groove 25 that connects the holes 23.

Figure 9:
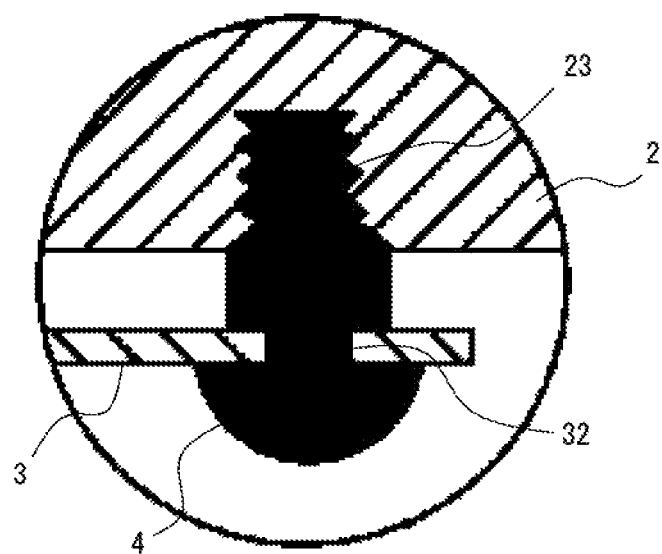
FIG. 9 is an enlarged cross-sectional view of a hole provided in the lens unit in FIG. 8A.

The lens unit 2 illustrated in FIG. 9 is different from the lens unit 2 illustrated in FIG. 4 in that it does not have the boss 22. The adhesive is filled from the filling hole 32 that corresponds to the hole 23 into the hole 23. When compared with FIG. 4, the lens unit 2 illustrated in FIG. 9 has a larger space between it and the holding member 3 for not having the boss 22. Thus, when the lens unit 2 and the holding member 3 are aligned with each other, a movable range in the direction of the optical axis 5 can be increased.

Embodiment 4

The cross-sectional shape of the groove 25 provided in the lens unit 2 may be changed.

Figure 10A:
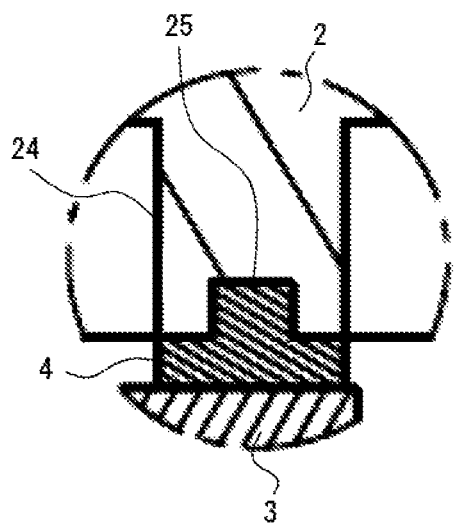
FIG. 10A is an enlarged cross-sectional view of a rib and a groove provided in a lens unit according to an comparative example of Embodiment 4.

The groove 25 provided in the lens unit 2 in FIG. 10A has a straight-shaped cross section in which an opening width is the same as the bottom width. The groove 25 provided in the lens unit 2 in FIG. 10B has a reverse tapered cross section in which the bottom width is larger than the opening width.

Figure 10B:
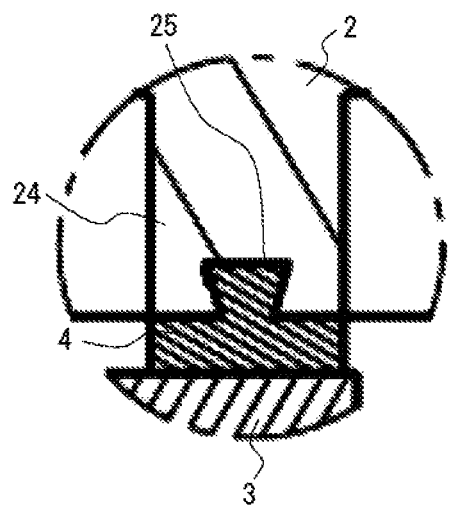
FIG. 10B is an enlarged cross-sectional view of the rib and the groove provided in the lens unit according to Embodiment 4.

A drag that prevents the engaging member 4 and the lens unit 2 from moving toward mutually separating direction is generated on the reverse tapered part of the groove 25 illustrated in FIG. 10B. When compared with the groove 25 illustrated in FIG. 10A, the lens unit 2 having the groove 25 illustrated in FIG. 10B can be engaged with the engaging member 4 with a larger engagement strength.

Embodiment 5

The hole 23 provided in the lens unit 2 may be changed into other shapes instead of being provided with internal threads.

Figure 11A:
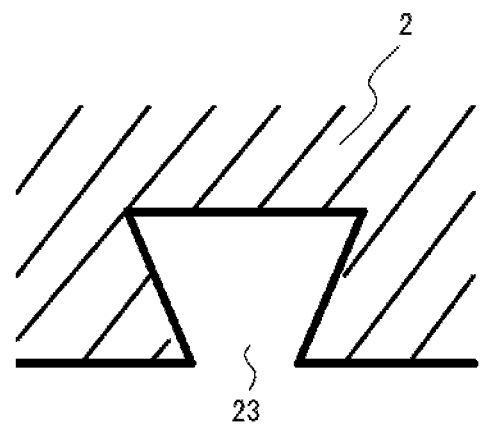
FIG. 11A is a cross-sectional view illustrating an example of a hole provided in a lens unit according to Embodiment 5.
Figure 11B:
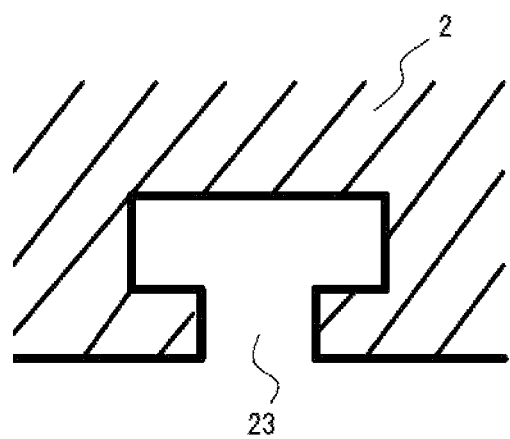
FIG. 11B is a cross-sectional view illustrating an example of the hole provided in the lens unit according to Embodiment 5.

The hole 23 provided in the lens unit 2 in FIG. 11A has a reverse tapered cross section in which an interior portion is wider than the opening of the hole 23. As illustrated in FIG. 11B, the hole 23 may have a T-shaped cross section in which an opening of the hole 23 is narrow and the inside thereof extends into a flange shape. In both of configurations illustrated respectively in FIGS. 11A and 11B, the lens unit 2 is prevented from moving to the axial direction of the hole 23 by the engaging member 4 that is formed by filling an adhesive into the hole 23 and curing the adhesive. In other words, the lens unit 2 is prevented from moving to the direction approximately identical to the optical direction of the lens 21. Thus the engagement strength between the engaging member 4 and the lens unit 2 can be increased. When the hole 23 has a reverse tapered shape or a T-shaped cross section, the engaging member 4 filled in the hole 23 and cured may take a form of resin rivet in the hole 23.

Embodiment 6

The lens unit 2 may be provided with a projection 26.

Figure 12A:
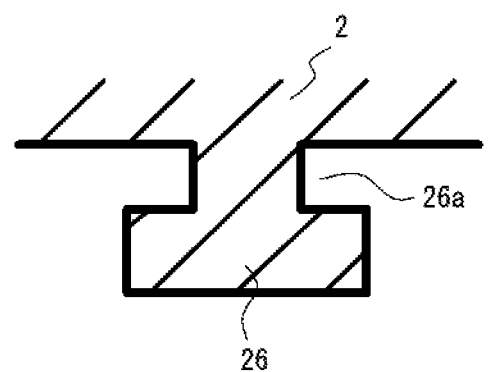
FIG. 12A is a cross-sectional view illustrating an example of a boss provided in a lens unit according to Embodiment 6.
Figure 12B:
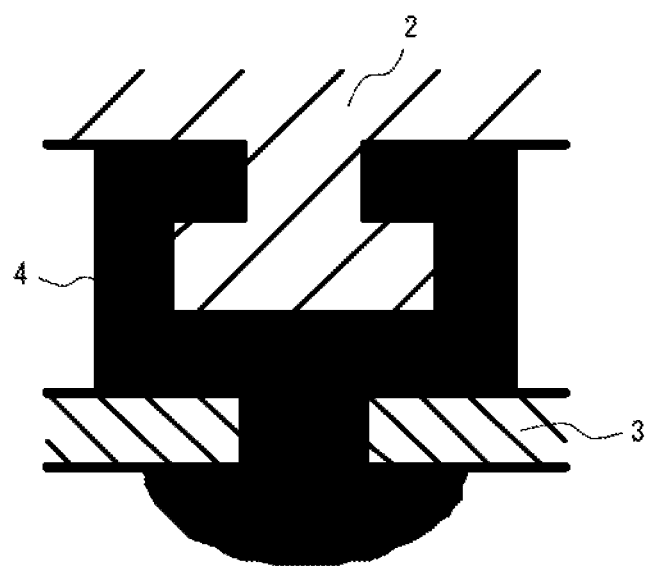
FIG. 12B is a cross-sectional view illustrating an example of the boss provided in the lens unit according to Embodiment 6.

The lens unit 2 illustrated in FIG. 12A is provided with the projection 26. The projection 26 has a constriction 26a. The projection 26 has a T-shaped cross section. As illustrated in FIG. 12B, the lens unit 2 and the holding member 3 may be engaged with each other by the engaging member 4 formed by curing the adhesive filled in the constriction 26b of the projection 26 illustrated in FIG. 12A. In the configuration illustrated in FIG. 12B, the projection 26 is prevented from moving in the axial direction, that is, the direction approximately identical to the optical direction of the lens 21, by the engaging member 4. Thus, the engagement strength between the engaging member 4 and the lens unit 2 can be increased.

In FIGS. 12A and 12B, the lens unit 2 is engaged with the engaging member 4 by the shape feature of the boss 22, and then is engaged with the holding member 3. In FIGS. 12A and 12B, the lens unit 2 may be provided with the hole 23. When the hole 23 is provided, the engagement strength between the engaging member 4 and the lens unit 2 can be further increased.

Embodiment 7

Alignment between the lens unit 2 and the holding member 3 in the axial direction may be performed by using a spacer 41.

Figure 13:
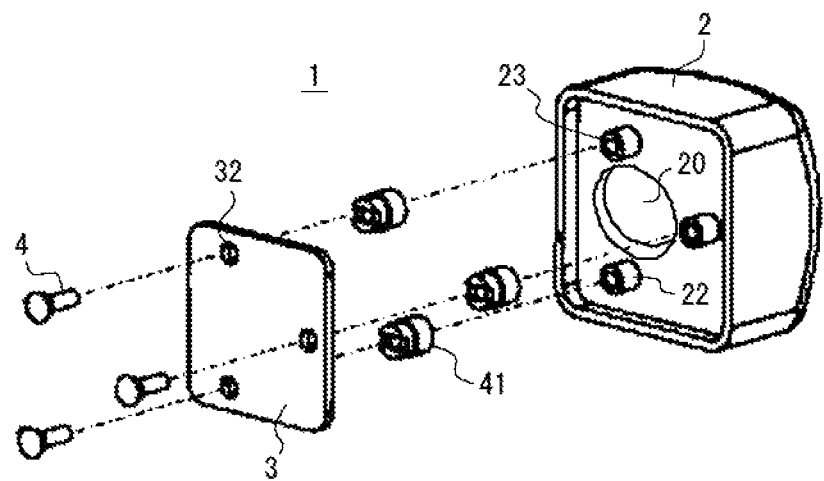
FIG. 13 is an exploded perspective view illustrating a configuration example of a camera module according to Embodiment 7.

The camera module 1 illustrated in FIG. 13 includes the lens unit 2 and the holding member 3. The lens unit 2 is provided with the opening 20, the bosses 22 and the holes 23. The holding member 3 is provided with filling holes 32 used for filling an adhesive. The bosses 22 and the holes 23 are provided relative to the filling holes 32, respectively. A position corresponding to the filling holes 32 located between the lens unit 2 and the holding member 3 is provided with a spacer 41 serving as a distance adjusting member. The spacer 41 may be an annular member such as a washer, for example, but is not limited thereto.

The camera module 1 illustrated in FIG. 13 may be assembled in the following procedures. The lens unit 2 and the holding member 3 are aligned with each other in the radial direction such that the optical axis 5 of the lens 21 coincides with the perpendicular line passing through the center of the light receiving surface of the image sensor 31.

The spacer 41 is inserted between the lens unit 2 and the holding member 3. The lens unit 2 and the holding member 3 are aligned in the axial direction such that they abut the spacer 41 respectively. When they are aligned with each other in the axial direction, the distance between the lens 21 and the image sensor 31 is determined depending on the thickness of the spacer 41. The thickness of the spacer 41 may be determined in advance such that the image forming position of the lens 21 of the lens unit 2 coincides with the light receiving surface of the image sensor 31 of the holding member 3. The distance between the lens 21 and the image sensor 31 may be measured with the spacer 41 having a different thickness abutted the lens unit 2 and the holding member 3. The thickness of the spacer 41 may be determined on the basis of the actual measurement of the distance between the lens 21 and the image sensor 31. A chart or the like that evaluates the state of focus of a captured image may be captured with the spacer 41 inserted. The thickness of the spacer 41 may be determined on the basis of the evaluation results of the chart or the like. A plurality of spacers 41 may be inserted. The lens unit 2 and the holding member 3 can be aligned with each other by the combined thickness of a plurality of spacers 41.

After the lens unit 2 and the holding member 3 are aligned with each other such that the lens 21 and the image sensor 31 are aligned with each other, an adhesive is filled from the filling hole 32. The lens unit 2 and the holding member 3 are engaged with each other by curing the adhesive.

In FIG. 13, the engaging member 4 formed in advance is indicated at a position corresponding to the filling hole 32. FIG. 13 is illustrated as an exploded perspective view. FIG. 13 does not illustrate that the engaging member 4 formed by curing the resin is mounted when the camera module 1 is assembled. The engaging member 4 is formed by curing the adhesive filled from the filling hole 32 after the lens unit 2, the holding member 3 and the spacer 41 are aligned with each other.

Figure 14:
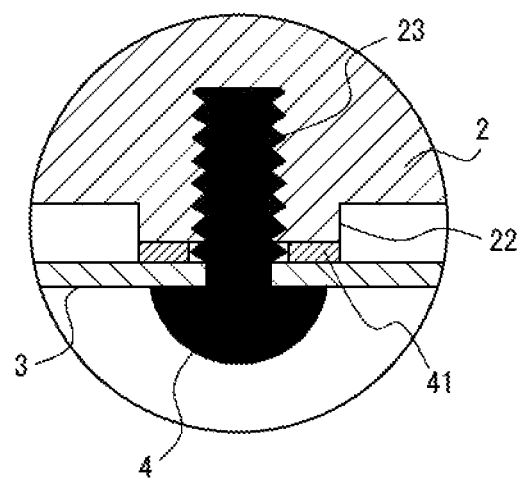
FIG. 14 is an enlarged cross-sectional view of a portion into which a spacer is inserted in FIG. 13.

As illustrated in FIG. 14, the lens unit 2 and the holding member 3 may abut respectively the spacer 41.

In this embodiment, the alignment between the lens unit 2 and the holding member 3 in the axial direction is performed by abutting the lens unit 2 and the holding member 3 against the spacer 41. Thus a device used for assembly does not require to be aligned in the axial direction. A device used for assembly may have less number of movable shafts.

Figure 15:
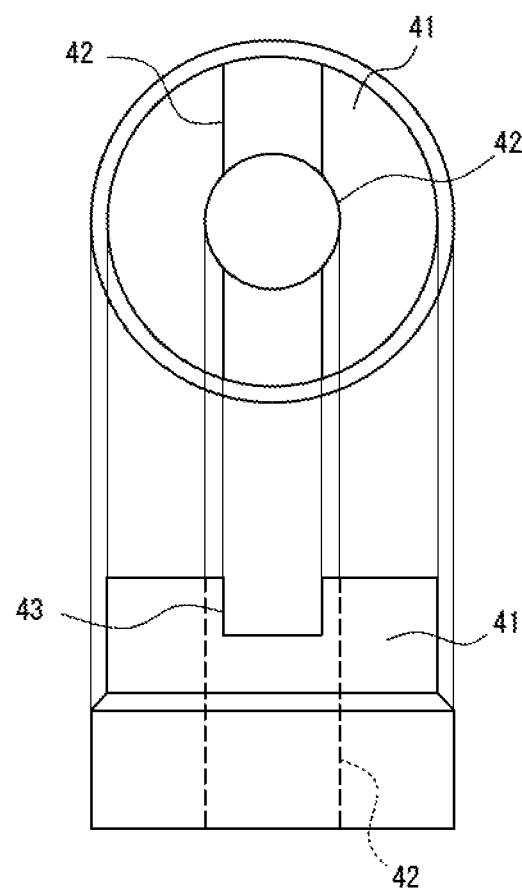
FIG. 15 is a plan view (upper half) and a side view (lower half) of the spacer in FIG. 13.

As illustrated in FIG. 15, the spacer 41 may include a spacer hole 42 and a spacer groove 43. The spacer 41 illustrated in FIG. 15 is used such a manner that the surface illustrated as a plan view faces the lens unit 2 or the holding member 3.

The spacer hole 42 is a through hole that extends in the direction of the optical axis 5 in the camera module 1. When the camera module 1 is assembled, the adhesive may be filled such that it passes through the spacer hole 42 into the boss 22 or the hole 23 of the lens unit 2.

The spacer groove 43 may be provided in the surface of the spacer 41 that faces the lens unit 2 or the holding member 3. When the spacer groove 43 is provided in the surface that faces the holding member 3, the adhesive can easily reach the inside of the surface that abuts the holding member 3 and the spacer 41. The spacer groove 43 may be used such that it aligns with the groove 25 of the lens unit 2 illustrated in FIG. 7 or FIG. 8B. When the spacer groove 43 is aligned with the groove 25, an adhesive can be filled successively from the spacer groove 43 to the groove 25. This configuration allows for stronger engagement between the holding member 3 and the spacer 41.

Figure 16:
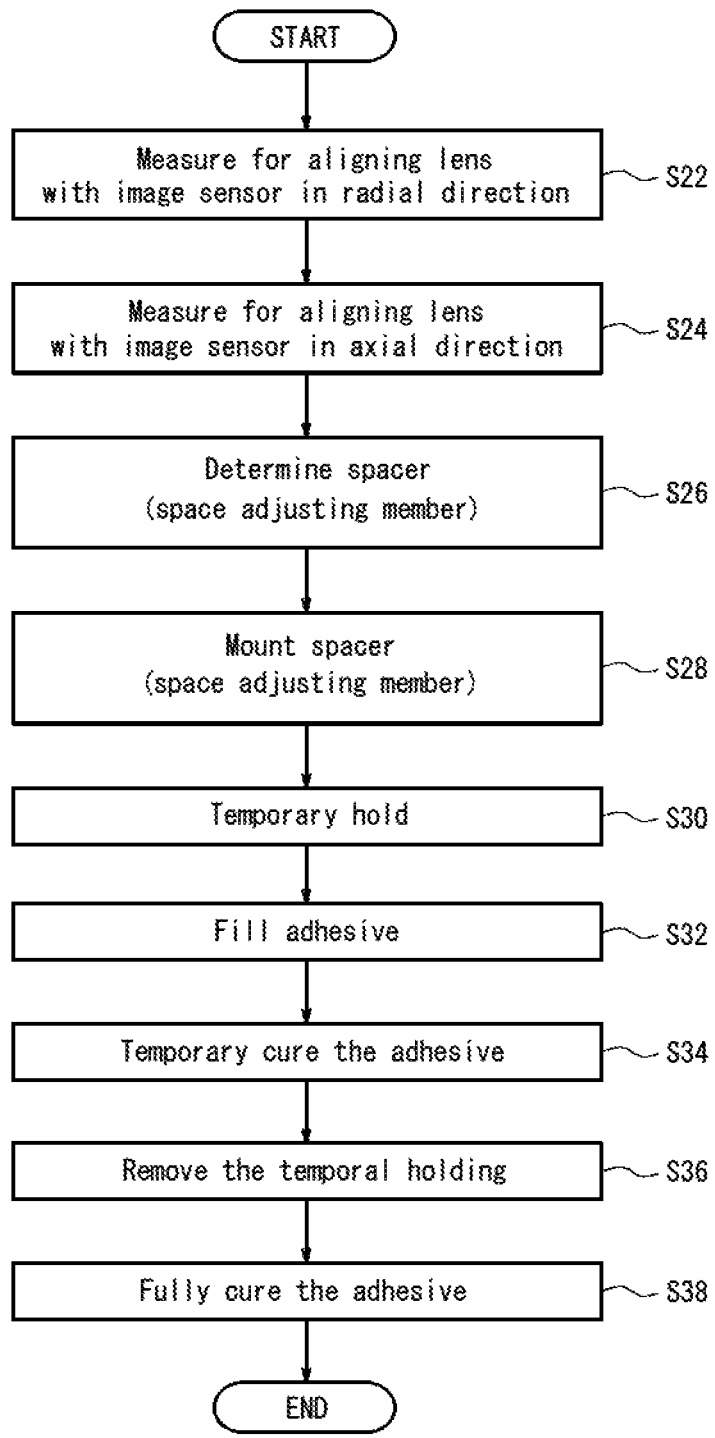
FIG. 16 is a flowchart of a manufacturing method of the camera module in FIG. 13.

The manufacturing method of the camera module 1 according to this embodiment can be performed along the flowchart illustrated in FIG. 16. Measurement for aligning the lens unit 2 and the holding member 3 with each other in the radial direction is performed (step S22). At least one of the lens unit 2 and the holding member 3 may be moved such that, as illustrated in FIG. 1, the optical axis 5 of the lens 21 coincides with the perpendicular line passing through the center of the light receiving surface of the image sensor 31. The position of the lens unit 2 and the position of the holding member 3 may be measured respectively.

In the measurement in step S22, only one of the lens unit 2 and the holding member 3 may be moved and the other may be fixed. Both of the lens unit 2 and the holding member 3 may be moved. The lens unit 2 and/or the holding member 3 may be moved by a 4-axis adjustable device, for example. The 4-axial adjustable device may be a robot, for example.

Measurement for aligning the lens unit 2 and the holding member 3 with each other in the axial direction is performed (step S24). The distance between the lens 21 and the image sensor 31 may be determined such that the image forming position of the lens 21 coincides with the light receiving surface of the image sensor 31. When the distance between the lens 21 and the image sensor 31 is determined, the positional relationship between the lens unit 2 and the holding member 3 is determined. In step S24, measurement for determining the distance between the lens 21 and the image sensor 31 is performed such that the image forming position of the lens 21 coincides with the light receiving surface of the image sensor 31.

One of the method of determining the distance between the lens 21 and the image sensor 31 is inserting a spacer 41 having various thicknesses different from each other between the lens unit 2 and the holding member 3 and actually measuring the distance between the lens 21 and the image sensor 31. Other methods include taking an image of a chart or the like with the spacer 41 inserted to evaluate the focus state of a captured image.

Step S22 and step S24 may be reversed.

Measurement for alignment in the axial direction in step S24 can be omitted by using the lens focus data or the height measurement data of the image sensor 31.

Figure 17:
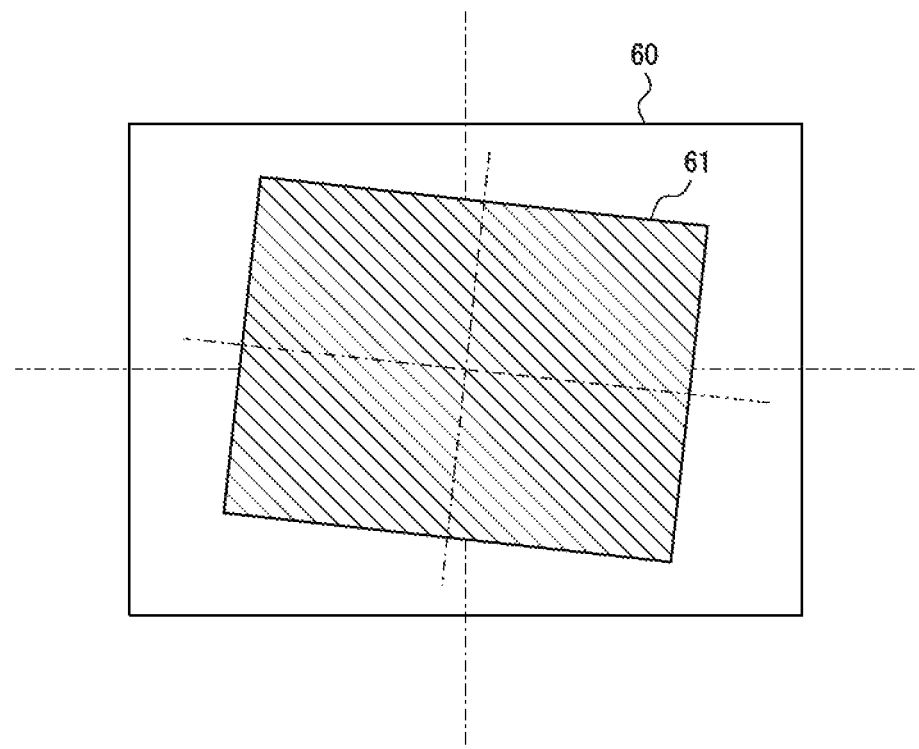
FIG. 17 is a diagram illustrating a positional relationship between an imaging area and an extraction area.

When the alignment in the radial direction is omitted by making an adjustment through extraction from an image captured by the image sensor 31, the measurement for alignment in the radial direction in step S22 can be omitted. Even when the lens 21 and the image sensor 31 are misaligned with each other in the radial direction, an image equivalent to that in the case where an alignment in the radial direction is performed can be obtained by setting an extraction area 61 in the range of the capturing area 60 as illustrated in FIG. 17.

An optimum thickness value of the spacer 41 is determined on the basis of the results of the measurement in step S24 (step S26).

The spacer 41 having a thickness determined in step S26 is mounted between the lens unit 2 and the holding member 3 (step S28). The positional relationship between the lens unit 2 and the holding member 3 in the axial direction is regulated by the spacer 41. The positional relationship between the lens unit 2 and the holding member 3 in the radial direction can be adjusted on the basis of the results of the measurement made in step S22. The adjustment of the positional relationship between the lens unit 2 and the holding member 3 in the radial direction may be performed by moving the lens unit 2 and/or the holding member 3 using a 4-axis adjustable device, for example. The 4-axis adjustable device may be a robot, for example.

The lens unit 2 and the holding member 3 are temporary held (step S30). The step S30 is similar to the processing in step S6 as illustrated in FIG. 5. The adhesive filling step (step S32), the adhesive temporal curing step (step S34), the temporal holding removal step (step S36) and the adhesive full curing step (step S38) are respectively the same as step S8, S10, S12 and S14 in FIG. 6.

Embodiment 8

In this embodiment, the rib 24 and the groove 25 are provided to connect the bosses 22 and the holes 23. Further, in variant 2, the groove 25 is provided to connect the holes 23. The lens unit 2 may not be provided with the bosses 22, and may be provided with the rib 24 and the groove 25 that are provided at least on a part of the circumference of the optical axis 5. In the lens unit 2, the rib 24 and the groove 25 may be provided over the entire circumference of the optical axis 5. The lens unit 2 may not be provided with the rib 24, and may include the groove 25 provided at least on a part of the circumference of the optical axis 5. When the lens unit 2 has the reverse tapered groove 25 as illustrated in FIG. 10B, the lens unit 2 may not include the holes 23. Thus the lens unit 2 may have more simplified configuration.

Embodiment 9

Figure 18:
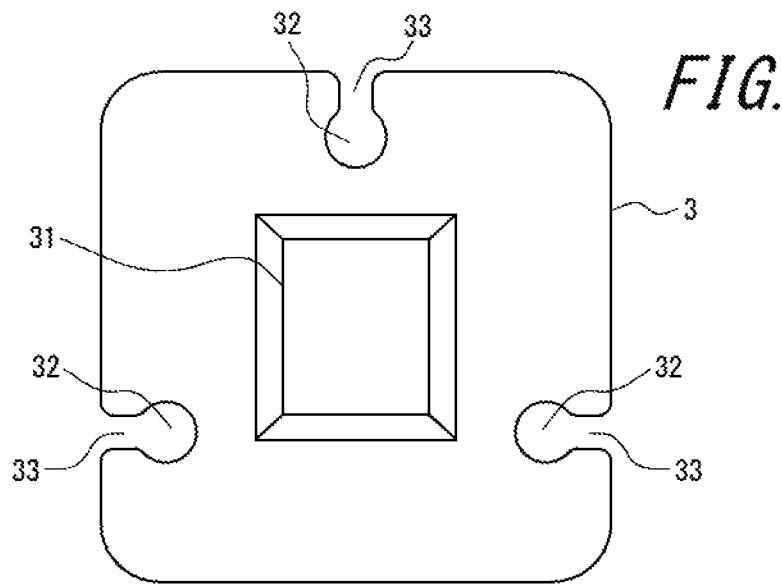
FIG. 18 is a diagram illustrating a configuration example of filling holes provided with notches according to Embodiment 9.

The filling hole 32 of the holding member 3 may have a notch 33 as illustrated in FIG. 18. The filling hole 32 communicates with the end of the holding member 3 by the notch 33. When the adhesive filled in the filling hole 32 is irradiated with UV light, the UV light irradiated from the side of the notch 33 can be irradiated into the filling hole 32. The notch 33 provided in the filling hole 32 may increase the degree of freedom of UV light in the irradiating direction when the adhesive is temporary cured.

Figure 19:
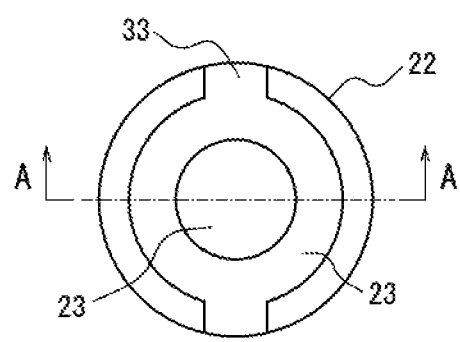
FIG. 19 is a diagram illustrating a configuration example of a boss provided with a notch according to Embodiment 9.
Figure 20:
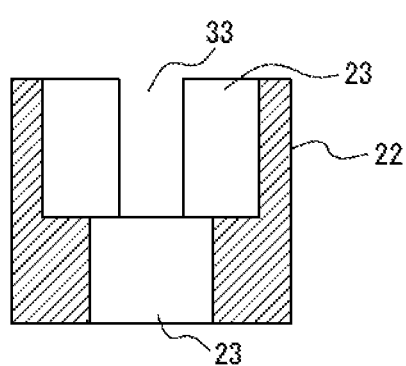
FIG. 20 is a cross-sectional view taken from line A-A in FIG. 19.

The boss 22 having the hole 23 may have a notch 33 as illustrated in FIGS. 19 and 20. The notch 33 allows the hole 23 to communicate with the outer periphery of the boss 22. When the adhesive filled in the hole 23 is irradiated with UV light, the UV light irradiated from the side of the notch 33 can be irradiated to inside of the hole 23. The notch 33 provided in the boss 22 can increase the degree of freedom of the UV light in the irradiation direction when the adhesive is temporary cured.

REFERENCE SIGNS LIST

1 Camera module
2 Lens unit
20 Opening
21 Lens
22 Boss
23 Hole
24 Rib
25 Groove
3 Holding member
31 Image sensor
32 Filling hole
33 Notch
4 Engaging member
41 Spacer
42 Spacer hole
43 Spacer groove
5 Optical axis

The invention claimed is:

1. A camera module comprising a lens unit containing a lens, a holding member provided with an image sensor and an engaging member of cured resin, wherein at least a part of the engaging member includes a surface that intersects with a direction of an optical axis of the lens, and on the surface, the lens unit and the holding member are engaged with each other, wherein the lens unit is provided with a first engaging part comprising a plurality of holes and a groove engaging the plurality of holes, the holding member is provided with a second engaging part comprising a through hole, and the engaging member spreads from the plurality of holes to the groove.

2. The camera module according to claim 1, wherein the lens unit is provided with a first engaging part and the holding member is provided with a second engaging part, and the engaging member engages the first engaging part and second engaging part with each other in the direction of the optical axis of the lens.

3. The camera module according to claim 2, wherein the engaging member communicates the through hole with the plurality of holes, and at least a part of an inner peripheral surface of the through hole has a shape that can be sandwiched by the engaging member in the direction of the optical axis of the lens.

4. The camera module according to claim 3, wherein the holding member has a notch that communicates an end of the holding member with the through hole.

5. The camera module according to claim 1, wherein the lens unit includes a boss that projects to a side that faces the holding member, and at least a part of the boss is in contact with the engaging member.

6. The camera module according to claim 5, wherein the lens unit includes a plurality of the bosses, and further includes a rib that connects the bosses, and wherein the rib is provided at least on a part of a circumference of the optical axis of the lens.

7. The camera module according to claim 1, wherein a normal line on at least a part of a surface of the engaging member in contact with the holding member has a component that directs toward a side of the lens unit and is in parallel with the optical axis of the lens.

8. The camera module according to claim 1, further comprising a spacer between the lens unit and the holding member.

9. The camera module according to claim 1, wherein the engaging member is a resin rivet.

10. The camera module according to claim 1, wherein the engaging member is a resin screw.

11. The camera module according to claim 1, wherein the cured resin is a photo-curable resin.

12. The camera module according to claim 1, wherein the cured resin is a thermosetting resin.

13. The camera module according to claim 12, wherein the lens unit and the holding member each includes a member having a melting point, and the thermosetting resin cures at temperatures lower than the melting point of the member of the lens unit and the member of the holding member.

14. A camera module manufacturing method comprising steps of:

aligning a lens unit containing a lens and a holding member provided with an image sensor with each other in a direction of an optical axis of the lens, the lens unit being provided with a first engaging part comprising a plurality of holes and a groove engaging the plurality of holes, the holding member being provided with a second engaging part comprising a through hole and including a plurality of filling holes and the lens unit including the plurality of holes aligned with the plurality of filling holes;

filling an adhesive into the plurality of holes of the lens unit from the plurality of filling holes of the holding member so that the adhesive spreads from the plurality of holes to the groove; and curing the adhesive to produce an engaging member of cured resin, wherein at least a part of the engaging member has a surface that intersects with the direction of the optical axis of the lens, and on the surface, the lens unit and the holding member are engaged with each other.

15. The camera module manufacturing method according to claim 14, further comprising a step of aligning the lens unit and the holding member with each other such that the optical axis of the lens and a perpendicular line passing through a center of a light receiving surface of the image sensor coincide with each other, and an image forming position of the lens coincides with the light receiving surface of the image sensor.

16. The camera module manufacturing method according to claim 14, wherein, in the step of producing the engaging member, the adhesive is cured by light, and after that, the adhesive is further cured by heating.

17. The camera module manufacturing method according to claim 15, wherein, in the step of producing the engaging member, the adhesive is cured by light, and after that, the adhesive is further cured by heating.

18. The camera module according to claim 1, wherein the holding member has a notch that communicates an end of the holding member with the through hole.

* * * * *